(12) United States Patent
Lee

(10) Patent No.: US 8,616,563 B2
(45) Date of Patent: Dec. 31, 2013

(54) DEVICE FOR ADJUSTING THE HEIGHT OF A VEHICLE

(75) Inventor: Steven David Lee, Kailua, HI (US)

(73) Assignee: Stealth Innovative Systems, LLC, Kailua, HI (US)

( * ) Notice: Subject to any disclaimer, the term of this patent is extended or adjusted under 35 U.S.C. 154(b) by 0 days.

(21) Appl. No.: 13/595,972

(22) Filed: Aug. 27, 2012

(65) Prior Publication Data

US 2013/0221626 A1 Aug. 29, 2013

Related U.S. Application Data

(60) Provisional application No. 61/575,718, filed on Aug. 25, 2011.

(51) Int. Cl.
*B60G 17/04* (2006.01)

(52) U.S. Cl.
USPC .................. 280/5.514; 280/124.145; 267/195; 267/203

(58) Field of Classification Search
USPC ................ 280/5.514, 124.145; 188/283, 312, 188/322.15; 267/195, 203
See application file for complete search history.

(56) References Cited

U.S. PATENT DOCUMENTS

| | | | | |
|---|---|---|---|---|
| 4,106,175 A | * | 8/1978 | Meyer | 29/243.517 |
| 4,923,038 A | * | 5/1990 | Lizell | 188/266.2 |
| 5,078,370 A | * | 1/1992 | McClellan | 267/220 |
| 5,487,535 A | * | 1/1996 | Carter et al. | 267/220 |
| 6,126,155 A | * | 10/2000 | Smith et al. | 267/220 |
| 6,257,605 B1 | * | 7/2001 | Zernickel et al. | 280/124.147 |
| 7,281,705 B2 | * | 10/2007 | Huprikar | 267/220 |
| 7,364,177 B2 | * | 4/2008 | Handke et al. | 280/124.147 |
| 7,959,135 B2 | * | 6/2011 | Voelkel | 267/64.21 |
| 2010/0096229 A1 | * | 4/2010 | Azekatsu | 188/282.1 |

* cited by examiner

*Primary Examiner* — Toan To
(74) *Attorney, Agent, or Firm* — Keri K. S. Krzykowski; Martin E. Hsia

(57) ABSTRACT

The present invention is a system for adjusting the height of vehicles that have coil spring suspensions. The invention may be added to existing vehicle suspensions without the need to remove and replace the existing vehicle suspension components. The invention includes cylinders, pistons, seals, dust shields, pressure pump(s) and storage tank(s). It also may optionally include electronic hardware, such as, an electronic controller and software, to control the functions of the system and sensor(s) which detect ground clearance and speed. The invention may be operated manually by a vehicle driver through push buttons, which may operate through the vehicle's existing cruise control buttons. Alternatively, the system can be automated through an electronic control unit (ECU) to avoid collision with obstacles in the vehicle's path.

13 Claims, 8 Drawing Sheets

DEVICE FOR ADJUSTING THE HEIGHT OF A VEHICLE

This application claims the priority of U.S. provisional patent application No. 61/575,718 filed on Aug. 25, 2011.

FIELD OF THE INVENTION

This invention generally relates to lift systems, and more specifically, lift systems for adjusting the ground clearance of vehicles to avoid collisions with obstacles, such as speed bumps or sloping driveways, which can scrape and damage the underbody of a vehicle.

BACKGROUND OF THE INVENTION

Motor vehicle suspension systems have an inherent problem that results in various compromises. Vehicle suspension systems are generally designed to avoid obstacles anticipated to be in the vehicle's path. Some vehicles, such as off-road vehicles, are designed with a high ground clearance to avoid obstacles encountered in rugged terrain, while other vehicles are designed with low ground clearance for high speed performance and/or sportier appearance. Ground clearance is the amount of space between the base of an automobile tire and the underside of the vehicle; or the shortest distance between a flat, level surface, and any part of a vehicle other than those parts designed to contact the ground (such as tires, tracks, skis, etc.). The benefits of low ground clearance and lower vehicle height are numerous and include less wind resistance, better fuel economy, better acceleration, better cornering, and better braking. Another significant advantage of low ground clearance is that it allows for better aesthetics such as providing a lower, sleeker, and sportier appearance that is desired by many drivers.

Many modern vehicles are designed and built with low ground clearance for the sportier appearance. Vehicle owners also lower their vehicles, through after-market modification, for enhanced performance, fuel economy and sportier appearance. One of the most common ways to lower a vehicle is through the use of a coilover, a vehicle suspension device that incorporates a coil spring positioned over and around a shock absorber shaft that is connected to a shock absorber body. Use of a coilover allows for a limited amount of height adjustment by adjusting the height of the coil spring's lower mounting point.

Reducing a vehicle's ground clearance height frequently results in undesired contact (collisions or scraping) between the vehicle and obstacles in the vehicle's path, such as speed bumps and sloping driveways. Unfortunately, when contact occurs, the vehicle is often damaged from the contact.

In the past, other vehicle lift systems have been developed, but they fall short of providing an adequate solution for many reasons. For example, some lift systems are designed and built to be vehicle-specific and are not readily adaptable to other vehicles. On the other hand, lift systems designed to fit a variety of vehicles often require the removal or replacement of existing components, resulting in added costs for the replacement components and loss of performance from the removal of critical or beneficial existing components. Such removed components may include coil springs, dust sleeves and bump stops.

Some prior art lift systems employ pressurized rubber air bags or air sleeves to replace coil springs in a suspension system. These systems do not retain the performance characteristics and benefits of metal coil springs, and incur the added cost of replacing the existing shock absorbers and/or metal coil springs with air bags or air sleeves. Moreover, components in lift systems that use metal coil springs may be so tall or thick that they do not fit into vehicles with the existing suspension springs. In such cases, the coil springs must be replaced with shorter springs resulting in a loss of suspension performance from the shorter spring.

Prior art lift systems also use hollow double-walled cylinder designs having concentric inner and outer cylinder walls. This design is complicated, more costly to manufacture, and more difficult to protect against dust and contaminants. These systems are also less efficient in the use of stored air pressure.

Prior art lift systems also do not typically provide dust shields (for the inner cylinder walls, outer cylinder walls, and/or the shock absorber shaft) to reduce contamination and wear on these surfaces and their seals attached thereon.

Still other prior art lift systems also have reduced pressurized surface areas on which the piston can act, resulting in inefficient use of power and the need for a larger storage tank to hold the compressed air (or other fluid), which is used to lift a vehicle. The tank required may reduce storage space, or even be so large that it cannot fit into many vehicles in a practical manner, and therefore is not able to be used in those vehicles.

Prior art lift systems that use bump stops, typically do so in a manner that reduces the effective pressurized area above the bump stop, making the system less efficient and requiring more air pressure and/or stored pressurized air to operate. They also do not provide a means for having the bump stop travel in tandem with the piston.

Prior art lift systems also do not have an adjustable, automated activation system that automatically senses obstacles in a vehicle's path and raises or lowers the vehicle based on the vehicle's proximity to the obstacles and its speed.

Other lift systems use components, such as large pneumatic cylinders or large air tanks that are often too large to install into many vehicles. These larger components also add undesirable weight to the vehicle, thus decreasing vehicle performance and efficiency.

Other systems that use compressed air tanks may also allow condensation (water) in the air tank to be passed through the air outlet port under certain driving conditions, which may cause surges of the water (surge water). Examples of such conditions include acceleration, braking and cornering. The surge water that passes through the air lines to the valves, pressure sensors, cylinders and other components has detrimental effects on these components.

Some other systems use hydraulic pumps and pressurized liquid to raise the vehicle, and use hollow double-walled cylinders having concentric inner and outer walls. This type of system is less efficient and requires significantly higher operating pressures to be effective. Hydraulic systems also require more costly hydraulic pumps and/or tanks filled with heavy hydraulic fluid and have the risk of fluid leaks and/or oil spills.

Hydraulic systems that have the cylinder and pistons fitted to the bottom of the spring located around the body of the shock absorber add undesirable unsprung weight to the suspension, thus reducing the performance of the suspension.

Hydraulic systems also pump fluid only when it is needed to lift a vehicle. Thus, they are slower acting systems that require strong pumps to raise a vehicle with enough speed to be effective. This means they draw higher amperage on a vehicle's electrical system. Further, because hydraulic systems typically raise vehicles slowly, they are not practical to use in many driving situations.

Prior art lift systems include: Umbrella Auto Design, Roberuta, Top Secret, Mode Parfum, Skipper, KW Hydraulic Lift System, Tech-Art, Ram Lift Pro, Phantom VIP, Stance-Solutions, Air Force, Air Lift, and Accuair.

It is an object of the present invention to provide an affordable lift system that is adaptable to a large variety of vehicles.

It is another object of the present invention to provide an efficient lift system that only requires small pressurized cylinders and storage tanks.

It is a further object of the present invention to eliminate or reduce the effects of environmental contaminants and the damage they cause to lift system components.

It is still a further object to provide means for operating the system in safe manner that does not require the driver to take his eyes off the road (to look for and operate switches), and to make the operation of the system automatic and hands-free.

It is a further object to overcome the drawbacks relating to the prior art devices discussed above and to provide at least some of the benefits described below.

DISCLOSURE OF THE INVENTION

The above and other objects are achieved by a device for lifting a vehicle that has a suspension system. The suspension system comprises a coil spring and shock absorber with a shock absorber shaft and a shock absorber body. The coil spring is coaxially coiled around the shock absorber shaft and has a coil spring diameter. The shock absorber body has a body diameter that is smaller than the coil spring diameter.

The device further preferably comprises a hollow cylinder having a cylinder outer diameter larger than the coil spring diameter. The cylinder is formed by circular cylinder top with a cylinder top rim, a central cylinder-shaft aperture, and cylindrical cylinder side walls connected to, and extending downwardly from, the cylinder top rim to a cylinder bottom. The cylinder top and said cylinder side walls define an inner cylinder bore. The cylinder bore has a cylinder inner diameter greater than the body diameter. An inlet port extends inwardly from the cylinder top rim into the cylinder bore. There is also an inner circumferential retaining ring groove located near the cylinder bottom. A retaining ring is also retained in the inner circumferential retaining ring groove. The retaining ring creates a barrier between the piston skirt (described below) and the cylinder side walls to prevent contaminants from entering said cylinder bore. The cylinder is sealingly coaxially mounted onto said shock absorber shaft through a cylinder-shaft seal in the cylinder-shaft aperture.

The device also comprises a cylindrical piston having a piston diameter less than the cylinder inner diameter slidable within the cylinder bore. The piston has a circular piston top with a central piston-shaft aperture and a piston top rim with an outer circumferential inlet recess at the piston top rim. A cylindrical coil spring flange extends downwardly from the piston top. A bump stop flange extends inwardly (toward the shock absorber shaft) from the coil spring flange. A bump stop having one or more bump stop grooves is retained in the bump stop flange. There is also an outer circumferential piston-bore groove parallel to, and downwardly spaced apart from, the inlet recess. A piston skirt flange extends downwardly from the piston-bore groove. The piston is sealingly coaxially mounted onto the shock absorber shaft through said piston-shaft aperture by a piston-shaft seal in said piston-shaft aperture.

The device also preferably contains a substantially cylindrical piston skirt having a skirt diameter less than the cylinder inner diameter, a skirt top, and a skirt bottom, attached to the piston skirt flange at said skirt top. The piston skirt has a circular bottom flange attached to the skirt bottom that extends outwardly (away from the shock absorber shaft) from the piston skirt. The skirt top is preferably tapered inwardly between the skirt top and the skirt bottom. The piston and the piston skirt can also preferably be integrally formed instead of being separate components.

The piston diameter and the skirt diameter are sufficiently less than the cylinder inner diameter so that the piston and the piston skirt can tilt or wobble within the cylinder bore.

A piston-bore seal is also preferably retained in the piston-bore groove. The piston-bore seal preferably contains a wiper to clean the cylinder bore when the cylinder and the piston slide apart. It also preferably contains an over-sized upper sealing lip that extends between 1 mm to 2 mm above the rest of the piston-bore seal.

The piston top, cylinder top, piston bore seal, and the cylinder side walls form an expandable pressure space that is in fluid communication with the inlet port.

The device is activated when a pressurized fluid enters through the inlet port into the expandable pressure space and causes the piston and cylinder to slide apart, thereby raising the vehicle. The device is deactivated when the pressurized fluid exits through the inlet port from the expandable pressure space and causes the piston and cylinder to slide together, thereby lowering the vehicle. The pressurized fluid is preferably pressurized air.

The device also preferably comprises a cylindrical dust shield that attaches to the bump stop grooves. The dust shield has a shield diameter that is greater than said body diameter.

The present invention also preferably contains an interface operably connected to the device that uses existing original equipment manufacturer cruise control switches to activate and deactivate the device, and an electronic control unit operably connected to the device for automatic sensing of the vehicle's ground clearance and speed.

DESCRIPTION OF A PRESENTLY PREFERRED EMBODIMENT

Figure 1:
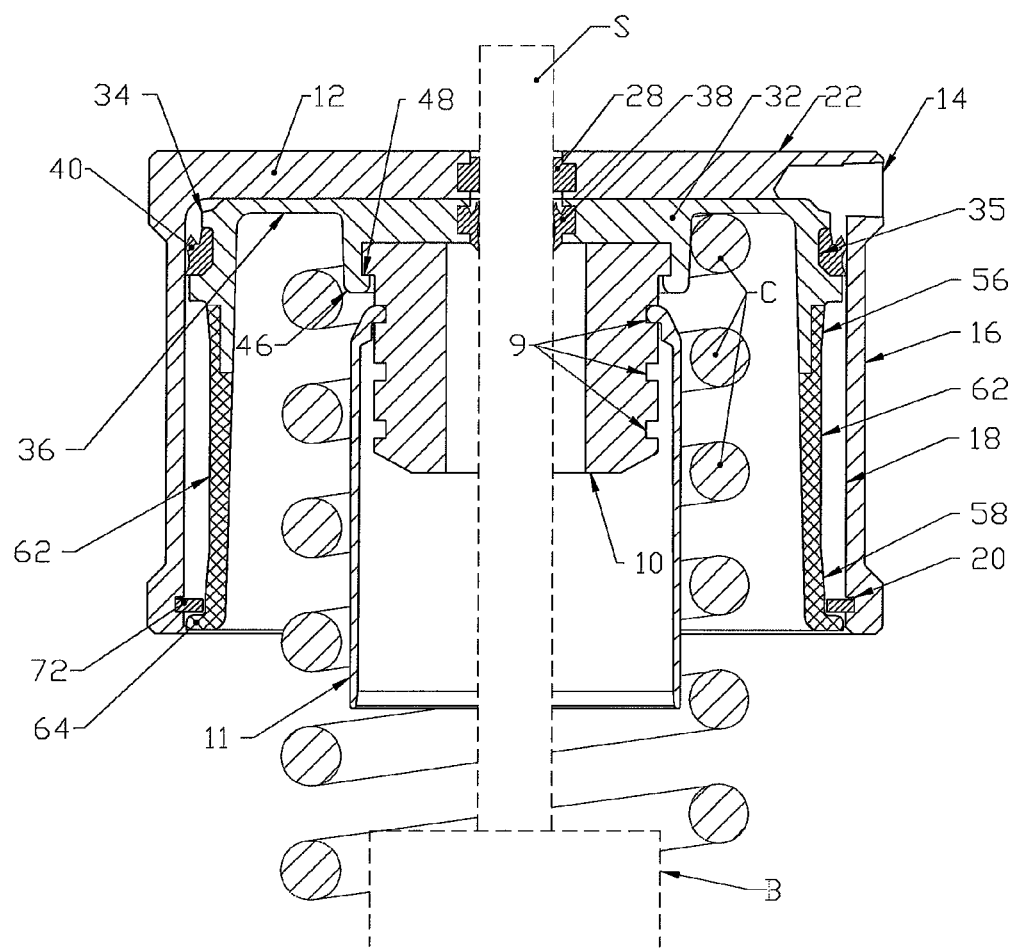
FIG. 1 is a longitudinal cross-sectional view of the present invention's cylinder and piston for adjusting the height of a vehicle, as installed over a shock absorber and coil spring.

Referring to FIG. 1, shown is a longitudinal cross-sectional view of the presently preferred embodiment of the invention comprising a lifting device that is placed on a vehicle's shock absorber shaft S and coil spring C, but beneath the vehicle's chassis (or body). The circular top of the hollow cylinder rests against the vehicle's underbody (or chassis) to support the weight of the vehicle. A piston 32 is positioned inside the cylinder 22 and is proportioned for travel within the cylinder bore 18. The piston 32 is situated at the top of the coil spring C. The weight of the vehicle is supported by this coil spring C through the springs' contact with the pistons' spring perch section 36. The cylinder 22, piston 32, rubber or plastic bump stop 10, and dust shield 11 are coaxial with the shock absorber shaft S passing through the center of the cylinder 22, piston 32, rubber or plastic bump stop 10, and dust shield 11.

The cylinder 22 has circular cylinder top. There is an aperture at the center of the cylinder top (cylinder-shaft aperture) to allow passage of a shock absorber shaft S. The cylinder has a cylinder-shaft seal 28 that forms an air-tight seal between the cylinder 22 and the shock absorber shaft S. It also has an inlet port 14 for the passage of pressurized fluids or gasses into and out of the cylinder 22 for activation and deactivation the lift system. The cylinder 22 is hollow and has a single wall, with an outer cylinder wall surface 16 and an inner cylinder wall surface (or cylinder bore) 18.

The piston 32 rests inside the hollow cylinder 22 (when the lift system is deactivated) and is proportioned for travel within the cylinder bore 18. The piston 32 may be constructed of metal, plastic or any other suitable materials. It has a piston to shaft seal (piston-shaft seal) 38 that forms an air-tight seal between the piston 32 and the shock absorber shaft S. It also has a piston skirt (or skirt) 62 that limits the pivoting of the piston when it is installed in the cylinder 22. The top of the piston skirt 62 contains a tapered section 56, which aids in the alignment of the piston 32 with the center of the cylinder 22 through the tapered section's contact with a retaining ring 72 when the piston is fully extended (activated). Likewise, the bottom of the piston skirt 62 has an outwardly tapered section 58 that also aids in the alignment of the piston 32 with the center of the cylinder 22 when the piston is fully retracted (deactivated). These features assist in keeping the axis of the piston in alignment with the axis of the cylinder when the piston is extended or retracted, and they help to eliminate the need to use the cylinder bore 18 to facilitate alignment. This means there is less wear on the cylinder bore 18 over the lifetime of the device.

The piston skirt 62 preferably has a circumference that is large enough keep the piston 32 in alignment with the cylinder 22 and small enough to allow the installation of the retaining ring 72 when the piston is installed in the cylinder. Preferably, the diameter of the piston skirt (skirt diameter) 62 is no larger than the cylinder bore 18, minus two times the width of the retaining ring's 72 radial wall thickness, minus the depth of the retaining ring groove 20 in the cylinder. The piston skirt preferably does not come into contact with, or wear upon, the cylinder bore 18. The piston skirt preferably only comes into contact with the retaining ring 72, which is a durable component and is not a sealing surface. By eliminating contact of the piston with the cylinder bore 18 (the inner wall of the cylinder), the wear upon the cylinder bore is greatly reduced and the life of the cylinder's bore 18 and the piston to bore seal (piston-bore seal) 40 are greatly improved.

The piston skirt 62 preferably has an unconventionally large gap between the skirt and the cylinder bore 18. The large gap (illustrated in FIG. 4) allows the piston 32 to be installed into the cylinder 22 in a highly pivoted orientation, which in turn allows for the use of seals with complex designs, such as highly compliant, over-sized sealing lips 41 and wiper feature (wiper) 42, as illustrated in FIG. 5, in the preferred device. These types of seals cannot be used in systems that restrict wobbling (tilting or canting) of the piston 32 during assembly because the wiper feature 42 and the sealing lip 41 would become lodged in the retaining ring groove 20, if the piston 32 entered or exited the cylinder 22 with the seals parallel to the groove as is done in the prior art. Wipers 42 are desirable because they wipe contaminants from the surface of the cylinder bore 18 every time the piston 32 is activated and travels downward in the cylinder 22, specifically the cylinder bore 18.

The piston skirt 62 may be integrated with the rest of the piston as a single piece, or it may be a separate modular component that can be attached to the piston 32 (at a piston skirt flange extending downwardly from the piston-bore groove 35) using conventional methods, such as a press fit or friction fit. By using a separate modular attachable piston skirt, different lengths of the piston skirt can adjust the total length of the piston 32 can be adjusted to accommodate various lengths of travel of the piston (or piston strokes) that may be desirable in conjunction with cylinders of various lengths.

In another preferred embodiment of the invention, the piston 32 has a removable piston skirt 62 that allows the piston to be rotated 360 degrees within the cylinder 22 during assembly. The skirt 62 may be attached to the piston after the piston has been inserted into the cylinder. This is not possible in the prior art devices shown in FIGS. 2 and 3. By employing removable piston skirt(s) that allow extensive rotation of the piston within the cylinder during assembly, an even wider range of seals and wipers may be used with the benefits that come with those seals and wipers. Additionally, by employing the use of removable piston skirts, the overall length of the piston can easily be altered to match the lengths of various cylinders, thus enabling the piston to have effective strokes of various lengths that may be desirable for various vehicles or various applications.

Preferably, the piston 32 also has two flanges. A circular bottom flange 64 extending outwardly from the bottom of the piston skirt 62 provides added strength and rigidity to the skirt. This circular bottom flange 64 and the piston skirt 62 work in conjunction with the retaining ring 72 to keep the piston in proper alignment relative to the cylinder 22, while the piston 32 is extending or retracting within the cylinder 22. These components also serve as a system to shield the cylinder bore 18 from dust and other contaminants, to reduce wear and improve the life of the cylinder bore 18, the piston-bore seal 40, and the piston skirt 62.

The piston 32 preferably also has a coil spring flange 46 extending downwardly from the piston top to retain the coil spring C in the proper position within the piston. This coil spring flange 46 also has a bump stop flange 48 extending inwardly toward the shock absorber shaft to retain an elastomeric bump stop 10. The bump stop does not contact the shock absorber shaft S. This positioning of the bump stop enables it to move in tandem with the piston 32 and the top of the coil spring C as the piston is activated and deactivated. This arrangement also allows the bump stop 10 to travel downward and upward over the shock absorber shaft S without any friction or wear on the shock absorber shaft, reducing wear on the shaft, unlike in the prior art.

The bump stop 10 preferably has one or more grooves (bump stop grooves) 9 in its outer circumference to secure a dust shield (or dust sleeve) 11. The dust sleeve 11 follows the travel of the piston 32 and bump stop 10 and maintains its position relative to the top of the coil spring C. This dust shield 11 protects the shock absorber shaft S and the shock absorber shaft seals 28,38 from contaminants such as dust, water and salt, which can lead to deterioration of these components.

In the presently preferred embodiment of the invention, the piston 32 has a circumferential groove (piston-bore groove) 35 that retains a piston-bore seal 40 to form an airtight seal between the piston 32 and cylinder bore 18. The piston-bore seal 40 may be located at the same level as the spring perch 36, or at a level that is higher or lower than the spring perch 36. The spring perch 36 rests on the top of the coil spring C. Ideally, the spring perch 36 is located as high as possible to minimize the height of the piston 32 that is situated on the top of the coil spring C.

The top of the piston preferably also has a reduced diameter relative to the rest of the piston due to an outer circumferential inlet recess 34 that circles the top of the piston. The reduced dimension of the top of the piston provides several significant benefits.

The circumferential inlet recess 34 allows the piston to travel within the cylinder 22 without interfering with any fitting installed into the inlet port 14 when the fitting extends inward beyond the cylinder bore 18. This helps to minimize the added height to the top of the coil spring C compared to lift systems in the prior art and it also permits the use of a cylinder 22 with a smaller outer diameter to fit in vehicles with space limitations.

The circumferential inlet recess 34 also facilitates the inrush of a pressurized fluid into the cylinder 22 through the inlet port 14 for faster lifting of a vehicle due to the reduced diameter and height dimensions of the piston top. The presently preferred embodiment of the invention uses compressed air, however, other pressurized gases or fluids (mediums) may be used in the alternative.

The reduced dimension also facilitates the piston's 32 ability to wobble (cant or tilt) within the cylinder 22 to facilitate the installation and the removal of the piston 32 from the cylinder 22. See FIG. 4. Preferably, the piston 32 and the cylinder 22 are allowed to wobble relative to the shock absorber shaft S up to 5 degrees or more through the use of highly compliant, flexible shaft seals 28, 38.

Figure 4:
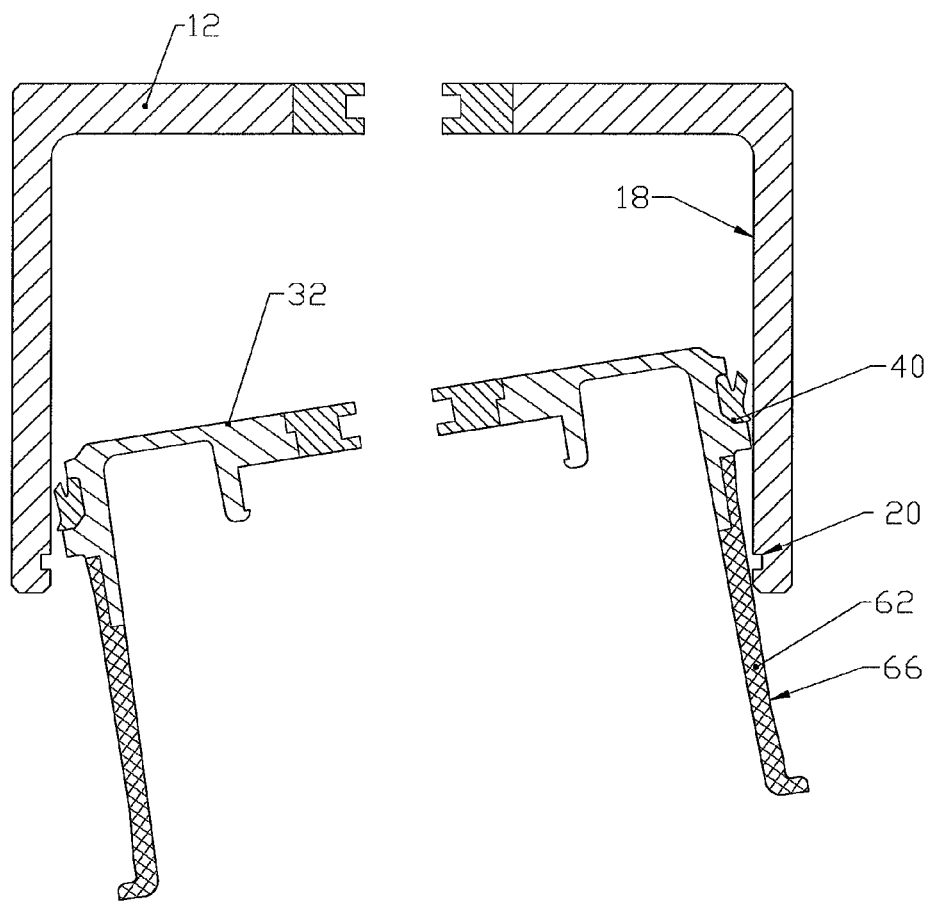
FIG. 4 is a cross-sectional view of the present invention with the piston tilted in an off-axis orientation relative to the cylinder (wobbling within the cylinder) as it would be during assembly of the piston into the cylinder or disassembly of the piston out of the cylinder.
Figure 5:
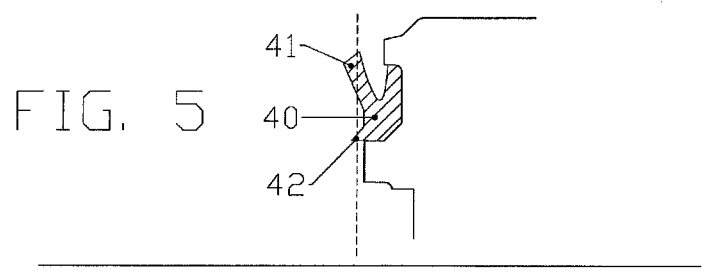
FIG. 5 is a cross-sectional view of the present invention's seal between the piston and cylinder bore (piston-bore seal).

FIG. 4 illustrates how the piston 32 of the present invention is able to wobble (or cant or tilt) relative to the cylinder 22 during assembly of the piston into the cylinder, due in part to: the cylinder not being double-walled, and the piston 32 having a reduced diameter at the top, and having a skirt diameter that is significantly smaller than the diameter of the cylinder bore and/or a removable skirt. FIG. 4 demonstrates how the piston-bore seal 40 can pass over the retaining ring groove 20 without being parallel to the groove. This greatly facilitates the use of seals 40 that have larger sizes and/or other features, such as over-sized sealing lips and/or wipers that would not be able to easily pass over the retaining ring groove 20 in the cylinder in a parallel orientation. The ability of the piston to wobble (or cant or tilt) within the cylinder, and to use seals that perform better, greatly improves the operation, durability, and reliability of the lifting apparatus in the present invention.

Without the ability for the piston 32 to wobble (or cant or tilt) within the cylinder, the piston-bore seal 40 would become lodged in the retaining ring groove 20 during installation or removal of the piston. The ability to tilt the piston 32 and piston-bore seal 40 out of parallel alignment with the retaining ring groove 20 allows the piston 32 and piston-bore seal 40 to pass over the retaining ring groove 20 without becoming lodged or damaged. The ability to wobble or cant the piston also allows for the use of piston-bore seals 40 with advantageous configurations and features, including over-sized upper sealing lips 41 and wiper features 42 (both shown in FIG. 5) that provide better sealing capabilities, clean the cylinder bore every time the piston is activated (when the piston 32 and cylinder 22 slide apart), greatly reduces the wear on the cylinder's bore, and increases the life of the cylinder and the bore seals. The wobbling (tilting or canting) allows for the use of such seals because without the wobbling, the seals would otherwise become lodged in the retaining ring groove 20 resulting in damage to the seals.

Referring to FIG. 1, the piston-bore seal 40 works in conjunction with the smooth surface of the cylinder bore 18 to form an airtight and expandable pressure space between the cylinder and the top of the piston. The retaining ring 72, inserted in the retaining ring groove 20, retains the piston 32 within the cylinder 22 and works in conjunction with the piston skirt 62 and upper 56 and lower 58 tapered sections of the piston skirt to maintain the alignment of the same relative to the vertical axis of the cylinder 22. The retaining ring 72 also serves as a barrier to keep dust and other contaminants away from the cylinder bore when the piston is in its retracted (deactivated) position.

Figure 2:
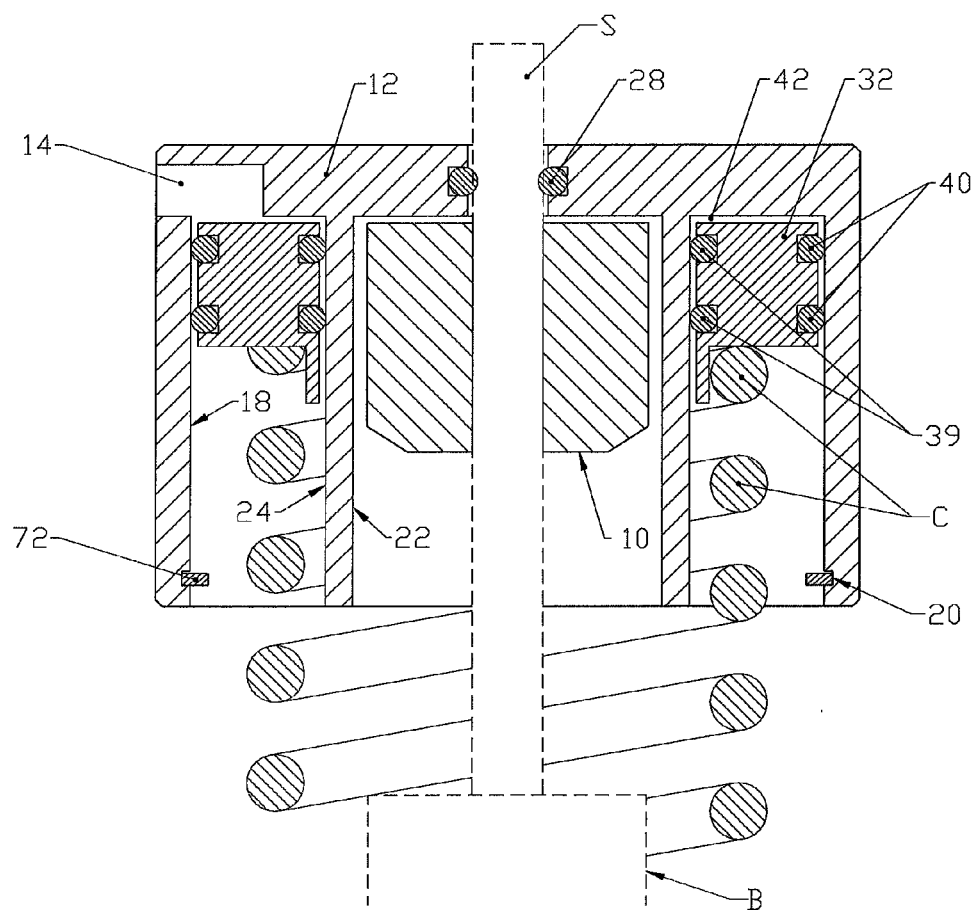
FIG. 2 is a cross-sectional view of a first prior art device, which contains a hollow double-walled cylinder with concentric inner and outer cylinder walls and a ring-shaped piston.

The presently preferred embodiment (as described above) provides significant benefits over the prior art. Referring to FIG. 2, shown is a prior art device that uses a conventional cylinder 12 with an outer cylinder bore (wall) 18, an inner cylinder bore (wall) 24 facing the piston 32, and an inner cylinder bore (wall) 22 facing the shock absorber shaft S. The inner cylinder bore (wall) 22 facing the shock absorber shaft S has a larger diameter than the shock absorber shaft S. The diameter of the inner cylinder bore 24 facing the piston 32 must be large enough to accommodate the thickness of the cylinder wall and any bump stop 10 and/or the shock absorber body B, as well as other component, such as a possible dust sleeve, which may interfere with the operation of the suspension system. During compression of the coil spring C, the shock absorber body B may move into the space within the inner cylinder bore (wall) 22 and thus the diameter of the inner cylinder bore (wall) 22 must be large enough to accommodate the size of the shock absorber body B.

Within the outer cylinder bore 18 and the inner cylinder bore 24 there is a ring shaped piston 32. This piston has inner seal(s) 39 that form an air tight seal against the inner wall 24 and outer seal(s) 40 that form an airtight seal against the outer cylinder bore 18.

Pressurized fluid or gas is introduced through the inlet port 14 to activate and press down upon the ring shaped piston 32. The annular area on the top of the piston 32 between the inner cylinder wall 24 and the outer cylinder wall 18 is the effective pressurized area. It is only in this area that pressure can be applied to the top of the piston, which then presses on the coil springs, to raise the cylinder 12 against the underbody of the vehicle. The effective pressurized area is substantially smaller than the effective pressurized area in the presently preferred embodiment of the invention (as shown in FIG. 1), which results in a lower lifting capacity for the prior art device in comparison to the present invention.

For example, in order to lift a 1,000 pound load on a single lifting device, the prior art requires a storage tank that has 8.247 times the capacity as the storage tank in the present invention. This assumes the controlled variables of a shock absorber with a 0.5" shaft, a cylinder bore with a 4.5 inch inside diameter (ID), piston stroke of 2 inches, tank air pressure at 120 PSI and a lift load of 1,000 pounds on a single cylinder.

Example of the Present Invention Vs Prior Art:

The present invention utilizes the 0.5" shock absorber shaft as its sealing surface (inner bore) while the prior art uses a 3" inner bore. It is able to lift 1,000 pounds with a tank size of approximately 0.154 Gallons. The prior art requires a tank size of 1.27 Gallons which is 824.7% of the present invention required tank size.

The present invention requires a tank size of 0.154 gallons to lift 1,000 pounds.

4.5" ID of cylinder 0.5" Shock Absorber Shaft diameter (serves as the inner bore)

120 PSI Tank Pressure 1,000 pounds Lift for a single cylinder

Tank Size Required: 0.154 Gallons

Prior art system requires a tank size of 1.270 gallons to lift 1,000 pounds.

4.5" ID of cylinder

3" Inner bore of a conventional hollow cylinder example

120 PSI Tank Pressure 1,000 pounds Lift for a single cylinder

Tank Size Required: 1.270 Gallons

The present invention can lift 1,702 pounds with a 1.270 gallon tank size.

4.5" ID 0.5" Shock Absorber Shaft diameter (serves as the inner bore)

120 PSI Tank Pressure 1,702 pounds Lift for a single cylinder

Tank Size: 1.27 Gallons

Figure 3:
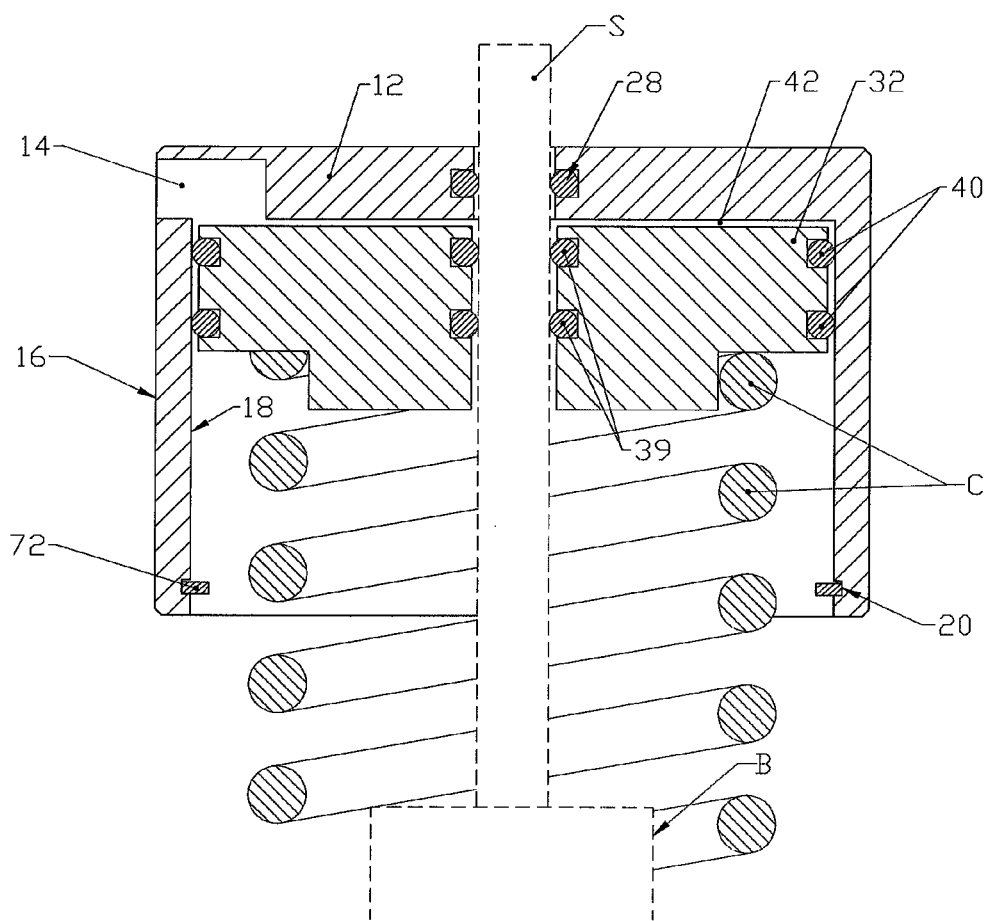
FIG. 3 is a cross-sectional view of a second prior art device.

FIGS. 2 and 3 illustrate the inner piston seals 39 and the outer piston seals 40 in the prior art devices. Due to limited available space for the seals and the coil spring C, the location, size, and design of the seals are restricted. To avoid interference between the seals and the coil spring C, the seals may be positioned above the coil spring as shown in FIGS. 2 and 3. As a result, the piston 32 must be thicker to accommodate the seals, and the top of the coil spring must be relocated to a lower position than in the present invention. This means that the ground clearance of the vehicle will not be as low as could be. To offset this raising of the vehicle, the original coil spring C may need to be replaced with a shorter coil spring at an added cost and with reduced performance.

The pistons 32 used in prior art, as shown in FIGS. 2 and 3, are also restricted from wobbling (or canting) within the cylinder 12 to prevent the seals 39, 40 from losing contact with the cylinder bore 18 (in FIG. 2), and the outer cylinder bore (wall) 18 and an inner cylinder bore (wall) 24 facing the piston 32 (in FIG. 3), which would result in a leak and failure of the lift system. Thus, the pistons 32 are designed to be thick (and tall) enough to prevent excessive wobbling (or canting) within the cylinder. The walls of the cylinder are used to guide the piston and keep it in alignment with the cylinder. The pistons are also designed to fit more snugly into the cylinders than in the present invention. This also prevents the pistons from wobbling excessively. This arrangement makes it difficult or impossible to use seals that may become lodged in any grooves in the cylinder wall such the groove 20 for the retaining ring.

The pistons used in prior art also have outer circumference surfaces that extend substantially in the longitudinal or axial direction, as illustrated in FIGS. 2 and 3. The length of the outer cylindrical surface must be long enough to maintain the axial alignment of the piston in the cylinder bore. In the present invention, illustrated in FIG. 1, the piston 32 uses a piston skirt 62 that is much smaller in diameter than the cylinder bore 18 to help maintain axial alignment of the piston 32 relative to the cylinder bore 18. The top sealing section of the piston 32 is above the skirt 62 and it is shorter in the axial direction than the cylindrical outer surface of pistons used in prior art.

In the prior art, shown in FIGS. 2 and 3, the piston 32 cannot travel lower than the retaining ring 72, which limits the extension of the piston. In contrast, the piston skirt 62 in the presently preferred embodiment of the invention, shown in FIG. 1, can easily travel lower than the retaining ring 72. This means it has a longer effective stroke than the prior art devices. This longer stroke results in the ability to lift vehicles to a greater height than in prior art with a cylinder of the same axial length. Whereas a prior art cylinder would need to be longer to accommodate the thickness of the piston. Most cars, however, have space limitations that restrict the size of the suspension lifting device. The present invention uses a device that maximizes the stroke length of the piston within a given cylinder height so that the device can be effectively used in vehicles with space limitations.

Referring back to FIG. 1, the top of the coil spring C may extend higher than the piston-bore seal 40 without interfering with that piston-bore seal 40. This feature significantly reduces the thickness of the piston that rests on top of the coil spring C and therefore allows the vehicle to be at a lower ground clearance when the system is not active. This reduced thickness of the piston top eliminates or significantly reduces the need to replace the original coil spring C with a shorter coil spring to maintain proper normal vehicle height. It also significantly reduces the overall length, weight, and cost of the present invention's cylinder and piston assembly while providing added stroke length for the piston compared to the prior art shown in FIGS. 2 and 3.

The practical range for the thickness of the piston top in the presently preferred embodiment is approximately between 3 to 25 mm. Preferably, the thickness should be approximately in the range of 3 and 10 mm. Optimally, the thickness should be approximately in the range of 3 to 6 mm. The prior art as shown in FIGS. 2 and 3 do not provide protection from contamination of the outer cylinder bore (wall) 18, the inner cylinder wall 24, the shock absorber shaft S, or the shock absorber shaft seal. There is no practical way to protect all of these surfaces without loosing efficiency and/or lifting capability of the system of the prior art system shown in FIG. 2. The lack of protection from contaminants results in added wear, shorter useful life of the components, lower reliability and higher maintenance costs than in my invention shown in FIG. 1.

Referring to FIG. 2, it is difficult or impossible to use a dust sleeve to protect the shock absorber shafts from contaminants without reducing the effective pressurized area to press upon the piston. The inner cylinder wall 22 occupies the space that would be needed by a dust sleeve unless the inner cylinder wall 22 was moved further away from the shock absorber shaft S. In order to accommodate the use of a bump stop and a dust sleeve that is large enough to fit over the shock absorber body B, the prior art's hollow cylinder inner wall surface 22 would need to be large enough to accommodate a dust sleeve within the inside diameter of the cylinder wall. This would greatly reduce the effective pressurized area over the ring shaped piston 32 and may render the piston 32 incapable of generating enough lifting force to raise the vehicle.

Figure 7:
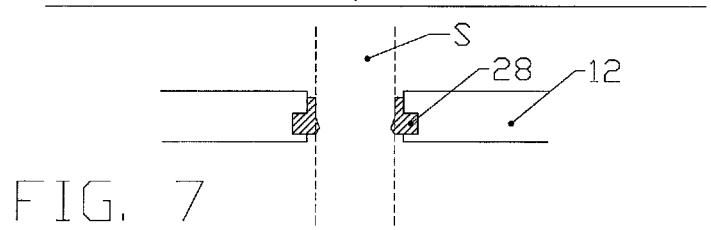
FIG. 7 is a cross-sectional view of the present invention's seal between the cylinder and the shock absorber shaft (cylinder-shaft seal).
Figure 8:
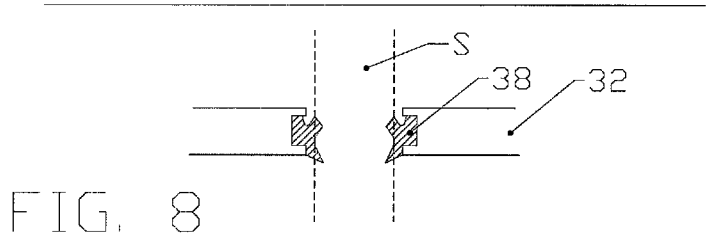
FIG. 8 is a cross-sectional view of the present invention's seal between the piston and shock absorber shaft (piston-shaft seal).

The seals used in the present invention, shown in FIG. 1, include the cylinder-shaft seal 28, the piston-shaft seal 38, and the piston-bore seal 40. These seals may be made of rubber, urethane or other commonly used seal materials. They may have a wide range of shapes, including simple O-rings, rectangular seals, U seals, and seals with wiper features. FIG. 5 illustrates a cross-sectional view of a presently preferred embodiment of a piston-bore seal 40. FIG. 7 illustrates cross-sectional view of a presently preferred embodiment the cylinder-shaft seal 28. FIG. 8 illustrates a cross-sectional view of a presently preferred embodiment of the piston-shaft seal 38.

Figure 6:
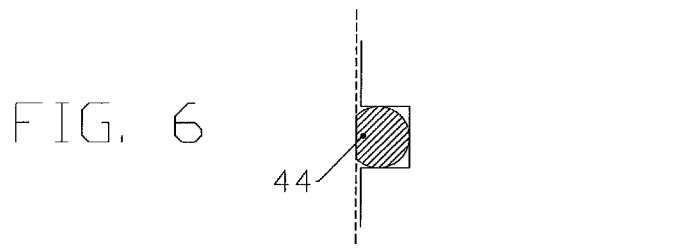
FIG. 6 is a cross-sectional view of a simple prior art piston-bore seal.

The piston-bore seal 40 in FIG. 5 has an upper sealing lip 41 with an over-sized dimension relative to the cylinder bore. This seal has better sealing capabilities than a simple seal, as illustrated in FIG. 6, especially if the piston is allowed to wobble (cant or tilt) within the cylinder. A seal with an over-sized upper sealing lip 41 would become lodged in the retaining ring groove if it were inserted into a cylinder without tilting the piston and seal at an angle to the groove. In the presently preferred embodiment of the invention, the upper sealing lip 41 extends between 1 mm to 2 mm above the rest of the seal. At 2 mm, the seal has greater sealing capacity to avoid leaks while the piston wobbles (cants or tilts) within the cylinder bore. The wiper 42 section of the seal in FIG. 5 serves to wipe contaminants from the cylinder bore when the piston is activated to move downward to raise the vehicle. This reduces the amount of contaminants on the cylinder bore that would otherwise contact the upper sealing lip 41. By wiping contaminants from the cylinder bore, the wiper 42 reduces wear on the bore and seal and prolongs the useful life of these components.

FIG. 6 illustrates a simple seal 44 that is typically used in the prior art devices shown in FIGS. 2 and 3. This type of seal is used because it can traverse over a groove in the cylinder, such as the retaining ring groove 20, without becoming lodged in the groove. However, this type of seal also has a number of shortcomings. As shown in FIG. 3, the simple seal would not seal well if the piston 32 were to wobble (cant) in relation to the cylinder bore 18. If the piston 32 were to wobble, the simple seal would lose contact with the cylinder's bore 18 and the seal would fail to maintain pressure. To prevent this failure, prior art systems restrict the wobbling of the pistons in the cylinder. This is accomplished in various ways, such as the use of double cylinder walls as illustrated in FIG. 2. The prior art also uses thick cylindrical piston designs that cannot wobble within the cylinder because of a close tolerance fit to the cylinder bore as shown in FIG. 3.

Another problem with simple seals 44 used in prior art (as illustrated in FIG. 6) is that they allow more contaminants to pass over the seal's sealing surface resulting in abrasion and damage to the seals and the cylinder bore. This type of seal does not have the ability to effectively wipe debris or contaminants from the cylinder bore 18 as does the seal with the wiper feature 42 illustrated in FIG. 5.

In the prior art, as shown in FIG. 2, the piston 32 is retained in alignment with the cylinder 12 by an outer cylinder bore (wall) 18 and an inner cylinder bore (wall) 24 facing the piston 32. This arrangement does not allow the piston to wobble (cant or tilt) once it is installed in the cylinder. This means that the piston seals 39, 40 remain parallel with any features in the cylinder walls 18, 24, such as the retaining ring groove 20, during assembly and dis-assembly of piston with the cylinder. Because the seals 39, 40 will enter and exit the cylinder in a position that is parallel with the retaining ring groove 20, they would tend to become lodged in the groove if they are large enough to do so. This can result in damage to the seals and it prohibits the use of seals with beneficial features, such as larger sealing lips with greater compression and/or compliance with the cylinder bore and better sealing capabilities. An example of a seal with beneficial design features is the use of wiper feature 42, as illustrated in FIG. 5, to clean the bore(s) and reduce wear of the inner and outer cylinder walls 18, 24 as illustrated in FIG. 2 and the seals 39, 40. Wiper seals would have wiper blades to wipe contaminants from the cylinder walls (bores).

Figure 10:
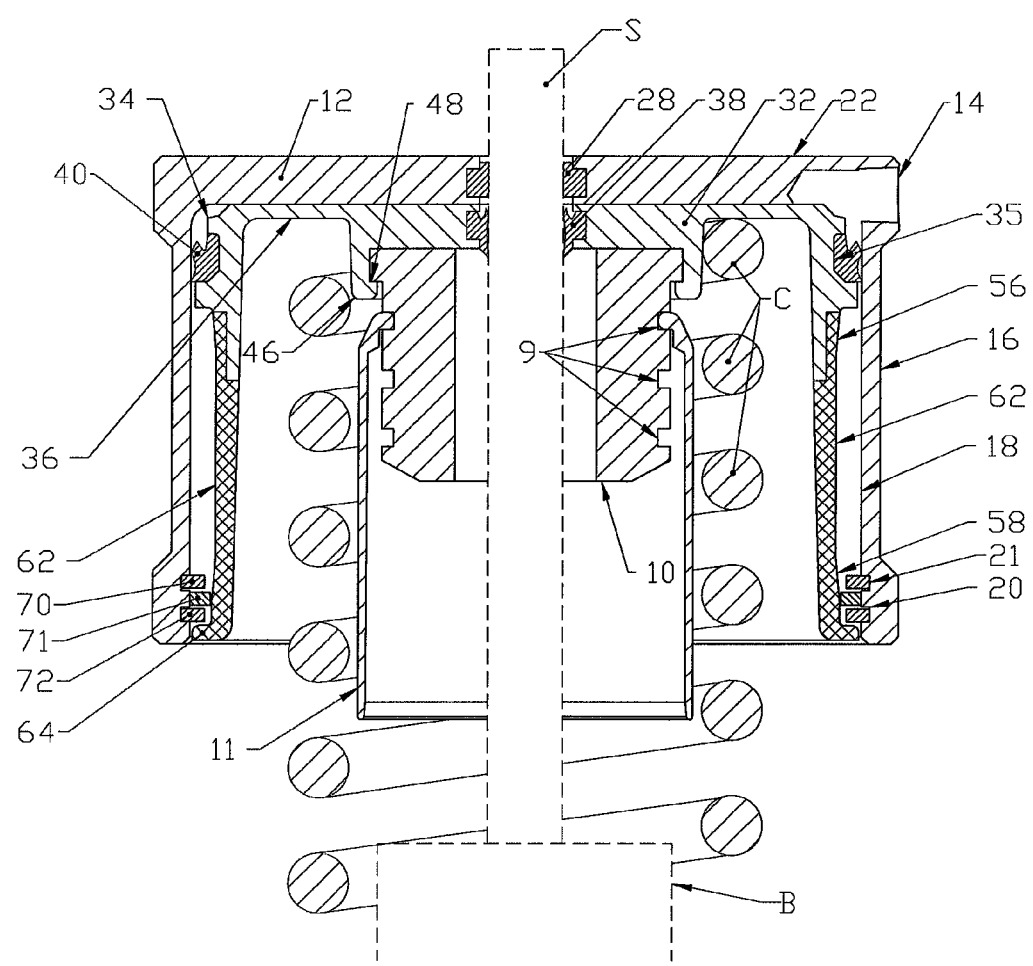
FIG. 10 is a longitudinal cross-sectional view of an alternate presently preferred embodiment of the invention.

FIG. 10 illustrates another presently preferred embodiment of the invention. In this embodiment, cylinder 22 has an upper retaining ring groove 21 and a lower retaining ring groove 20 located at the bottom of the cylinder bore 18. An upper retaining ring 70 is located in the upper retaining ring groove 21. A lower retaining ring 72 is located in the lower retaining ring groove 20. A guide ring 71 is located between the upper retaining ring 70 and the lower retaining ring 72. The guide ring 71 extends inwardly toward the shock absorber shaft S, farther than either the upper retaining ring 70 or lower retaining ring 72, so that it comes into contact the piston skirt 62 instead of the upper and lower retaining rings 70, 72. The guide ring 71 is preferably made of Teflon or any other suitable smooth material.

The use of a smooth surfaced (Teflon) guide ring 71 is preferable because it is used to guide the piston skirt 62 instead of the hard (metal) retaining rings 70,72. This reduces wear on the piston skirt 62, thus prolonging the life of the piston skirt 62 and reducing repair and/or replacement costs.

Figure 11:
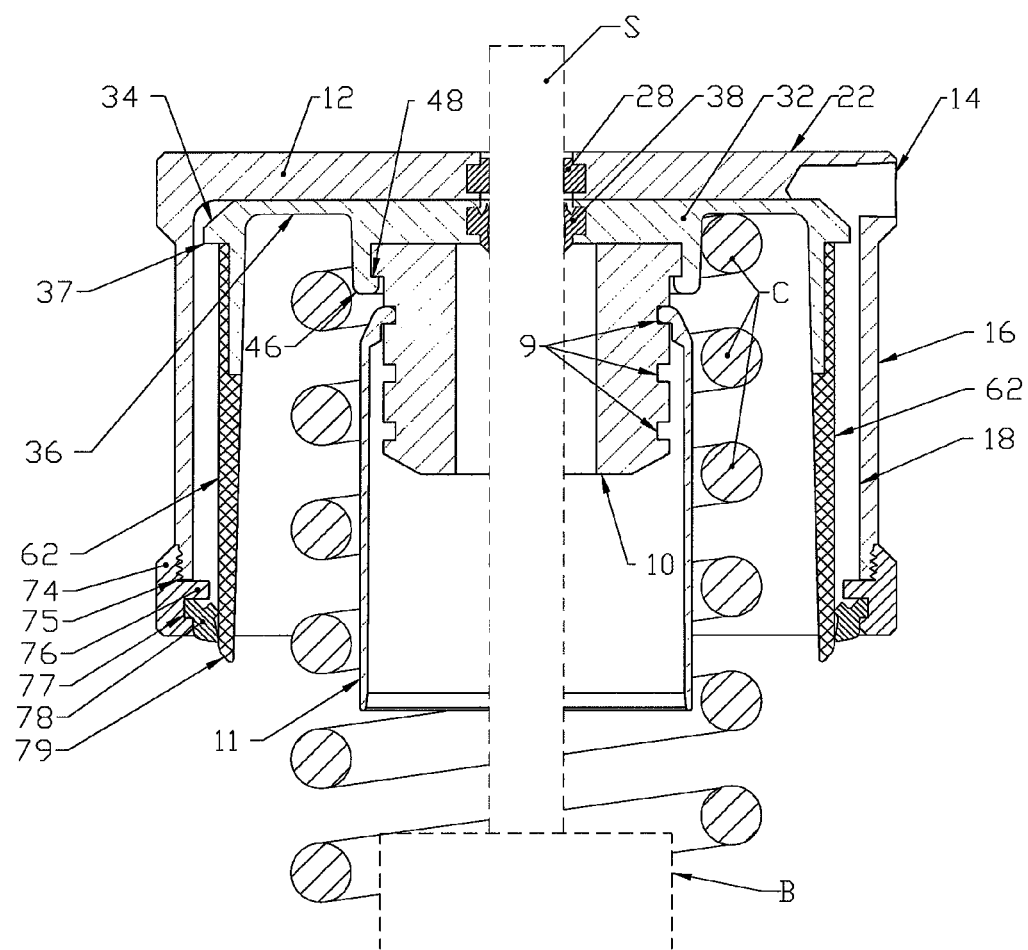
FIG. 11 is a longitudinal cross-sectional view of another alternate presently preferred embodiment of the invention.

FIG. 11 illustrates another presently preferred embodiment of the invention. The piston 32 has an outer circumferential piston-flange 37 downward from the outer circumferential inlet recess 34 at top of the piston 32 to serve as a positive stop that limits the travel of the piston 32 in the cylinder 22. The piston 32 preferably has a skirt 62 that is smooth and straight (not tapered). A cylinder ring 74 is attached to the bottom of the cylinder side walls through conventional methods, including screw threads 75 in the cylinder ring 74 and the bottom of the cylinder 12. The cylinder ring 74 has a cylinder ring flange 76 that extends inward (toward the shock absorber shaft) and serves as a positive stop to limit the travel of the piston 32. The cylinder ring 74 has a cylinder ring groove 77 to retain a cylinder ring seal 78. The cylinder ring seal 78 forms an air-tight seal between the cylinder ring 74 and the piston skirt 62. The bottom edge of the piston skirt (at the skirt bottom) has a taper 79 to facilitate the assembly of the cylinder ring seal 78 over the bottom edge of the piston 79.

The presently preferred embodiment shown in FIG. 11 utilizes an undersized piston skirt 62 that does not come into contact with the cylinder bore 18. Preventing contact between the cylinder bore 18 and the piston skirt 62 results in less wear upon the cylinder bore 18 and the piston skirt 62 resulting in longer life of these parts and less cost for repairs. This presently preferred embodiment of the invention also allows the piston 32 to wobble (cant or tilt) within the cylinder bore 18 until the cylinder ring 74 and the cylinder ring seal 78 are installed onto the cylinder 12. Once the cylinder ring 74 and cylinder ring seal 78 are installed, they form an air-tight seal with the piston skirt 62 and maintain adequate alignment of the piston 32 within the cylinder 12.

The cylinder ring 74 may be various lengths to provide a means of easily altering the length of the cylinder 12 and cylinder ring 74 assembly. Likewise, the cylinder 12 may be made in various lengths to alter the length of the cylinder 12 and cylinder ring 74 assembly. By altering the length of the cylinder 12 and the cylinder ring 74 assembly, the stroke of the piston 32 within the cylinder 12 can altered to achieve an optimum stroke length.

The cylinder ring 74 may be made in any length and may effectively replace the cylinder side walls. Likewise, the cylinder 12 may be made in any length and may be so short that the cylinder side walls are effectively replaced by the cylinder ring 74 with adequate length to provide adequate stroke length for the piston 32.

Activation of the Lifting System, Manual Buttons, Cruise Control Buttons and Automated Activation Referring to FIG. 1, in the presently preferred embodiment of the invention, the piston 32 is activated by the introduction of a pressurized fluid, such as compressed air, through the inlet port 14. The pressurized air activates the device by pushing the piston 32 downward and the cylinder 12 upward (the piston and cylinder slide apart). The force of the cylinder being pushed upward raises the vehicle when the force is great enough to overcome the weight of the vehicle. When the device is deactivated, the pressurized air rushes out of the inlet port 14 and the piston 32 and cylinder 12 return to their resting position adjacent to each other (the piston and cylinder slide together).

Figure 9:
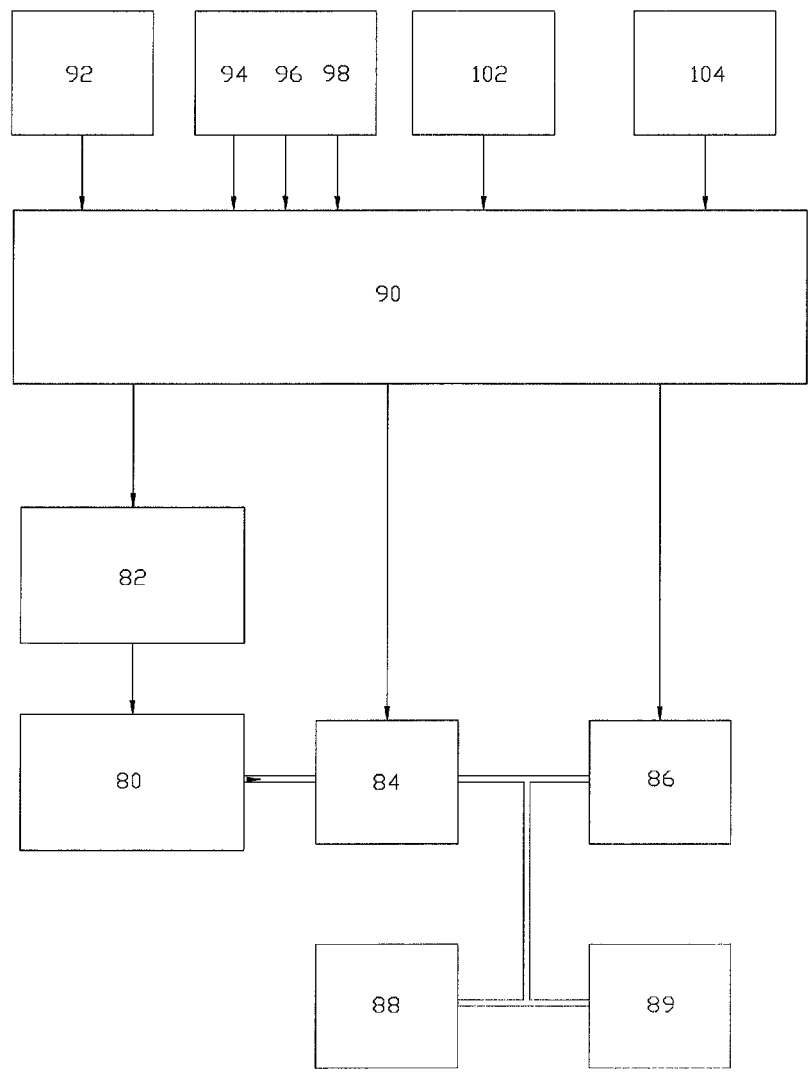
FIG. 9 is a flow diagram of how the present invention operates through the use of an Electronic Control Unit (ECU) and other controls.

FIG. 9 shows a flow diagram of the lift system. First a compressor pump 82 generates compressed air that is stored in a storage tank 80. The compressed air is released from the storage tank 80 into the cylinder and piston assemblies 88 and 89 through the opening of one or more up valve(s) 84 to raise the vehicle. To lower the vehicle back to its normal state, a down valve 86 is opened to release the air from the cylinder and piston assemblies.

The up valve 84 and the down valve 86 may be activated by various means such as manual switches or controls. In a presently preferred embodiment, an Electronic Control Unit (ECU) 90 is employed. The ECU receives inputs from various sources such as push button(s) 92, 94, 96 and 98, which are controlled by a driver. The push button(s) 92, 94, 96 and 98 may be the Original Equipment Manufacturer (OEM) cruise control buttons and/or they may be any combination of OEM button(s) or after-market button(s). The push buttons may also be rocker switches, or push button type switches or any other type of switch. They may have LED lights that display one or more colors to indicate status or for basic illumination. The LED lights may be lit constantly or pulsed at various frequencies to indicate the status of various functions and/or settings, or to provide feedback to the user when setting parameters to the control system. Additional feedback is optionally provided to the driver through audible devices, such as buzzers, which can be varied in their tone and to indicate such things as the status of the operation of the system or confirmation of commands to the system.

The invention may be installed on the front wheels only or on the front and rear wheels of vehicles. The front and rear devices may be activated simultaneously, or independently from each other. They may also be activated with a delay between the front and rear devices.

Many vehicles have existing OEM cruise control systems with press buttons that are located on or near the steering wheel to safely activate a vehicle's cruise control system. These buttons can be safely activated without the need for a driver to take his eyes off the road to look for the buttons because they are easily accessible at or near a driver's fingertips. These OEM cruise control systems typically do not operate at slower vehicle speeds because cruise control systems are intended to be used at highway speeds. Thus, these systems are perfect for a dual use in connection with the present invention, which is only activated when a vehicle is at a slower speed as it approaches an obstacle in its path.

In the presently preferred embodiment of the invention, the ECU 90 has an interface that responds to outputs from the OEM cruise control buttons 94, 96 and 98 when the OEM cruise control system is not in use. The OEM cruise control buttons are used to perform various functions. For example, the Main switch 92 can be used to turn the vehicle's cruise control functions on or off and to activate or deactivate the lift system. When the OEM cruise control system is turned off, the lift system is turned on and the output from the Accel button 96 can be used, for example, to activate the lifting of the lift system and the vehicle. The Decel button 98 can be used to initiate the lowering of the lift system.

Prior art vehicle lift systems require the operator to take his eyes off the road so that a driver can look for and press an after-market manual switch that is added to the vehicle for raising and lowering of the vehicle. The use of the OEM cruise control system interface in the present invention provides a convenient and safer method for activating the lift system. It also eliminates the need for after-market switch(es) to be installed in the vehicle, which would require additional labor and costs.

The OEM cruise control system interface also enables the cruise control buttons to be used to select and activate other features, for example proximity sensors and speed sensors. The proximity sensors may be ultrasonic sensors, infrared sensors, capacitive discharge sensors or any other type of sensor that can measure the proximity of the vehicle to the road surface or obstacles, such as speed bumps, that are under the vehicle. They can be installed under the vehicle in one or more locations. The proximity sensors are preferably adjusted or calibrated to activate the ECU and the lift system at the desired distances from obstacles. When a signal from the proximity sensor(s) to the ECU indicates that the sensor is closer to an obstacle than desired, the ECU activates the up valve 84 to raise the vehicle away from the obstacle. The ECU uses various parameters, such as time and proximity, to check for the presence of obstacles, and automatically lowers the vehicle to the normal state when the desired conditions are met. The ECU may also receive input signals from a vehicle speed sensor. The ECU may use such information to control or limit the raising and/or lowering of the vehicle depending on the speed of the vehicle.

The ECU 90 may be programmed in a variety of ways. For example, the ECU 90 can be programmed directly through the use of the push button(s) 92 and cruise control buttons 94, 96 and 98. It can also be configured through the use of a computer connected to the ECU and/or through the use of DIP switches, portable flash drives or other devices. The ECU 90 may also be programmed to modify its response to inputs (adjustment) regarding time durations for the activation of the up valve and down valve; delay time for the starting of the compressor pump upon starting the vehicle; duration for the vehicle to remain in the lifted position prior to activating the lowering of the vehicle; proximity distance settings for the automatic activation of the lifting and lowering of the vehicle; sensitivity and speed settings for the input signals from the proximity sensor(s); vehicle speed settings for various functions such as for limiting the lifting of the vehicle and for the automated lowering of the vehicle if excessive vehicle speed is detected. These types of parameters may be programmed into the ECU 90 and/or the user may select or adjust the parameters affecting the ECU 90 and its operation of the invention.

While the present invention has been disclosed in connection with the presently preferred embodiments described herein, it should be understood that there may be other embodiments which fall within this spirit and scope of the invention as defined by the claims. Accordingly, no limitations are to be implied or inferred in this invention except as specifically and as explicitly set forth in the claims.

Industrial Applicability

This invention can be used whenever it is necessary to lift a vehicle to avoid a collision with an obstacle in the vehicle's path.

I claim:

1. A device for lifting a vehicle with a suspension system having a coil spring and shock absorber with a shock absorber shaft and a shock absorber body, wherein said coil spring has a coil spring diameter and is coaxially coiled around said shock absorber shaft, and said shock absorber body has a body diameter smaller than said coil spring diameter, comprising:

a hollow cylinder having a cylinder outer diameter larger than said coil spring diameter, formed by a circular cylinder top with a cylinder top rim, a central cylinder-shaft aperture, and cylindrical cylinder side walls connected to and extending downwardly from said cylinder top rim to a cylinder bottom, wherein said cylinder top and said cylinder side walls define an inner cylinder bore having a cylinder inner diameter greater than said body diameter, an inlet port extending inwardly from said cylinder top rim into said cylinder bore, an inner circumferential retaining ring groove at said cylinder bottom, and wherein said cylinder is sealingly coaxially mounted onto said shock absorber shaft through said cylinder-shaft aperture;

a piston having a piston diameter less than said cylinder inner diameter slidable within said cylinder bore having a circular piston top, a central piston-shaft aperture, a piston top rim, an outer circumferential inlet recess at said piston top rim, a cylindrical coil spring flange extending downwardly from said piston top, a bump stop flange extending inwardly from said coil spring flange, an outer circumferential piston-bore groove parallel to, and downwardly spaced apart from, said inlet recess, a piston skirt flange extending downwardly from said piston-bore groove, wherein said piston is sealingly coaxially mounted onto said shock absorber shaft through said piston-shaft aperture;

a substantially cylindrical piston skirt having a skirt diameter less than said cylinder inner diameter, a skirt top and a skirt bottom attached to said piston skirt flange at said skirt top, wherein said piston skirt has a circular bottom flange extending outwardly from said piston skirt;

wherein said piston diameter and said skirt diameter are sufficiently less than said cylinder inner diameter whereby said piston and said piston skirt can tilt within said cylinder bore;

a piston-bore seal retained in said piston-bore groove whereby said piston top, said cylinder top, said piston bore seal, and said cylinder side walls form an expandable pressure space that is in fluid communication with said inlet port;

a retaining ring retained in said inner circumferential retaining ring groove;

a bump stop retained in said bump stop flange having one or more bump stop grooves;

whereby said device is activated when a pressurized fluid enters through said inlet port into said expandable pressure space and causes said piston and said cylinder to slide apart, thereby raising said vehicle, and deactivated when said pressurized fluid exits through said inlet port from said expandable pressure space and causes said piston and said cylinder to slide together, thereby lowering said vehicle; and wherein said retaining ring creates a barrier between said piston skirt and said cylinder side walls to prevent contaminants from entering said cylinder bore.

2. A device according to claim 1, further comprising a cylindrical dust shield having a shield diameter attached to said bump stop grooves, wherein said shield diameter is greater than said body diameter.

3. A device according to claim 1, wherein said cylinder is sealingly coaxially mounted onto said shock absorber shaft by a cylinder-shaft seal in said cylinder-shaft aperture.

4. A device according to claim 1, wherein said piston is sealingly coaxially mounted onto said shock absorber shaft by a piston-shaft seal in said piston-shaft aperture.

5. A device according to claim 1, wherein said piston and said piston skirt are integrally formed.

6. A device according to claim 1, wherein said piston-bore seal contains a wiper to clean said cylinder bore when said cylinder and said piston slide apart.

7. A device according to claim 1, wherein said piston-bore seal contains an over-sized upper sealing lip.

8. A device according to claim 7, wherein said upper sealing lip extends 1 mm above said piston-bore seal.

9. A device according to claim 7, wherein said upper sealing lip extends 2 mm above said piston-bore seal.

10. A device according to claim 1, wherein said piston skirt is tapered inwardly between said skirt top and said skirt bottom.

11. A device according to claim 1, further comprising an interface operably connected to said device that uses existing original equipment manufacturer cruise control switches to activate and deactivate said device.

12. A device according to claim 1, further comprising an electronic control unit operably connected to said device for automatic sensing of said vehicle's ground clearance and speed.

13. A device according to claim 1, wherein said pressurized fluid is pressurized air.

* * * * *